Figure 1:
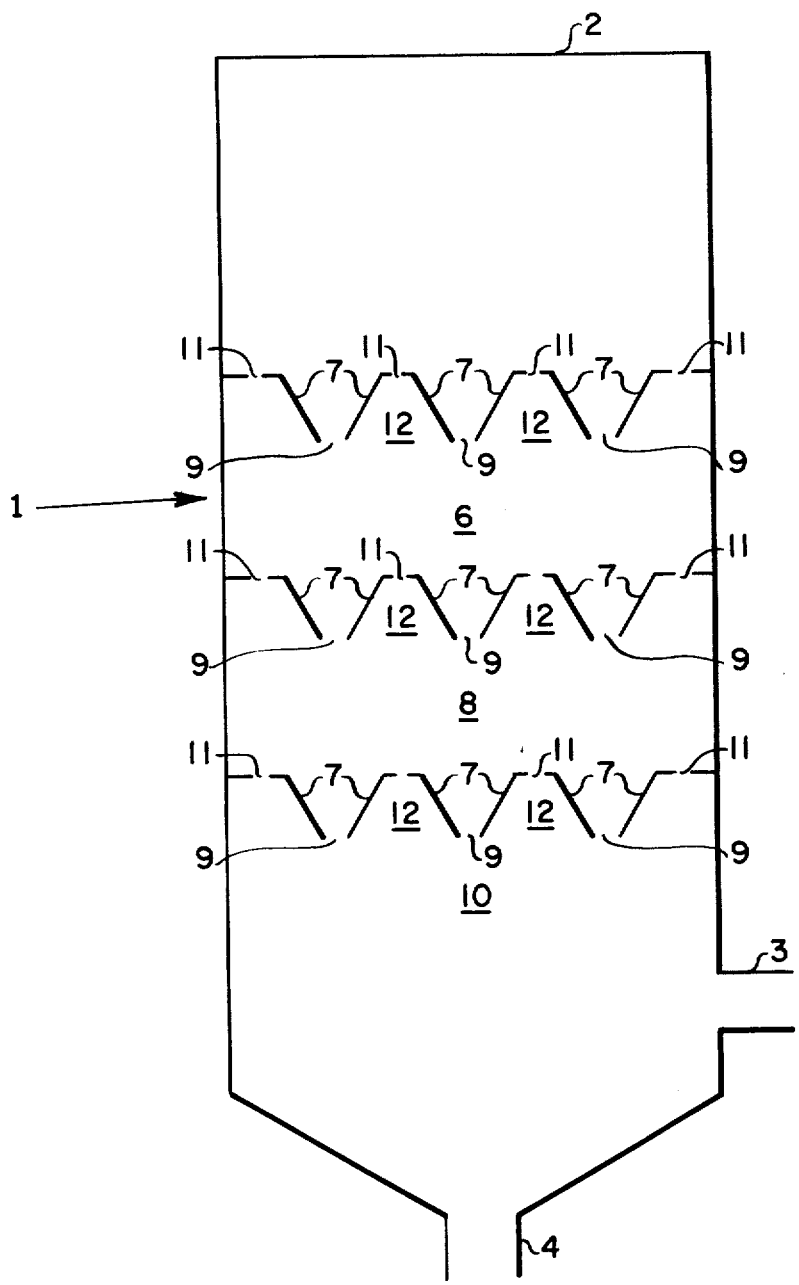

United States Patent [19]

Fuller

[11] 4,045,542
[45] * Aug. 30, 1977

[54] PRODUCTION OF CHLORINE DIOXIDE

[75] Inventor: Willard A. Fuller, Grand Island, N.Y.

[73] Assignee: Hooker Chemicals & Plastics Corporation, Niagara Falls, N.Y.

[ * ] Notice: The portion of the term of this patent subsequent to Aug. 17, 1993, has been disclaimed.

[21] Appl. No.: 712,283

[22] Filed: Aug. 6, 1976

Related U.S. Application Data

[63] Continuation-in-part of Ser. No. 532,666, Dec. 13, 1974, Pat. No. 3,975,505.

[51] Int. Cl.$^2$ .................. C01B 11/02; C01B 7/04; C01D 3/04
[52] U.S. Cl. .................. 423/478; 423/499; 423/500; 423/505
[58] Field of Search .............. 423/478, 499, 500, 504, 423/505

[56] References Cited

U.S. PATENT DOCUMENTS

| | | | |
|---|---|---|---|
| 3,829,557 | 8/1974 | Winfield | 423/478 |
| 3,895,100 | 7/1975 | Cowley | 423/478 |
| 3,933,987 | 1/1976 | Schulz et al. | 423/478 |
| 3,975,505 | 8/1976 | Fuller | 423/478 |

Primary Examiner—Edward Stern
Attorney, Agent, or Firm—Peter F. Casella; William J. Crossetta, Jr.

[57] ABSTRACT

There is provided an improved process for the production of chlorine dioxide wherein an alkali metal chlorate, and hydrochloric acid are reacted in a vessel, and the salt crystals are separated from the generator crystal slurry.

14 Claims, 2 Drawing Figures

PRODUCTION OF CHLORINE DIOXIDE

This application is a continuation-in-part application of Ser. No. 532,666, filed Dec. 13, 1974 now U.S. Pat. No. 3,975,505, issued Aug. 17, 1976

This invention relates to chlorine dioxide and chlorine production. More particularly, this invention relates to improvements in a method for treating effluent emanating from chlorine dioxide generators.

Inasmuch as chlorine dioxide is of considerable commercial importance in the areas of pulp bleaching, water purification, fat bleaching, removal of phenols from industrial wastes, textile bleaching, and the like, it is very desirable to provide processes by which chlorine dioxide can be economically generated.

One of the means for generating chlorine dioxide is by the reaction of alkali metal chlorate, alkali metal chloride reducing agent, and a mineral acid. Preferably, in such processes, the alkali metal chlorate employed is sodium chlorate, the alkali metal chloride is sodium chloride, and the mineral acid is sulfuric acid or a mixture of sulfuric acid with other mineral acids such as phosphoric acid or hydrochloric acid. Such reactions as occur are exemplified by the following:

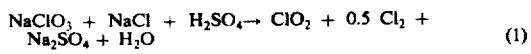
$$NaClO_3 + NaCl + H_2SO_4 \rightarrow ClO_2 + 0.5\ Cl_2 + Na_2SO_4 + H_2O \quad (1)$$

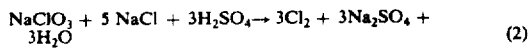
$$NaClO_3 + 5\ NaCl + 3H_2SO_4 \rightarrow 3Cl_2 + 3Na_2SO_4 + 3H_2O \quad (2)$$

A further means for generating chlorine dioxide is by the reaction of an alkali metal chlorate with hydrochloric acid in an aqueous reaction solution. Preferably, in such processes, at least one active agent is employed such as vanadium pentoxide, silver ions, manganese ions, dichromate ions and arsenic ion. Such reactions occur and are exemplified by the following:

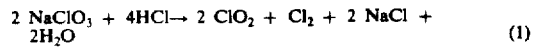
$$2\ NaClO_3 + 4HCl \rightarrow 2\ ClO_2 + Cl_2 + 2\ NaCl + 2H_2O \quad (1)$$

$$NaClO_3 + 6HCl \rightarrow 3\ Cl_2 + NaCl + 3H_2O \quad (2)$$

Such reactions are employed commercially, with the reactants continuously fed into a reaction vessel and the chlorine dioxide and chlorine produced therein continuously removed from the reaction vessel. A single vessel process for producing chlorine dioxide is set forth in British Pat. No. 1,347,740 wherein alkali metal chlorate and a hydrochloric acid solution are continuously fed to a single vessel generator-evaporator-crystallizer for reaction in aqueous solution in the presence of a catalyst in proportions sufficient to generate chlorine dioxide, at a temperature of from about 25 to about 100° C and an acidity in the generator of from about 0.25 to about 2.5 normal, removing water from the reaction system by vacuum-induced evaporation, conducted under a vacuum of from about 20 to about 400 millimeters of mercury absolute to effect evaporation of water vapor, with concurrent withdrawal of chlorine dioxide, crystallizing the alkali metal chloride salt with the generator-evaporator-crystallizer and withdrawing the crystals as a slurry from the generator.

The rate of chlorine dioxide generation in the process increases with the concentration of alkali metal chlorate present in the reaction solution. Therefore, the concentration of alkali metal chlorate is preferably maintained on the high side of the applicable concentration range of about 0.2 to about 5 molar. This is especially true during operation in the region from approximately 75 to 90° centigrade and at pressures in the region of 400 millimeters mercury absolute, which conditions favor the solubility of large amounts of alkali metal chlorate. As the temperature is reduced in coordination with the development of a vacuum over the reaction solutions, to withdraw water vapor, the concentration of chlorate is necessarily reduced to prevent crystallization of chlorate from solution which would negate any advantage derived from an increased reaction rate. Thus, when operating at the preferred pressure from about 100 to about 300 millimeters mercury absolute and temperatures between about 50 to 90 degrees centigrade, the concetration of alkali metal chlorate should be between about 0.2 to about 3 molar.

The rate of chlorine dioxide generation in the process also increases with the concentration of alkali metal chloride in said aqueous reaction solution. This increase in reaction rate with concentration of a by-product (alkali metal chloride) presents a highly desirable reaction parameter permitting optimum operation in a saturated solution over solid alkali metal chloride, the later being removed from the reactor as desired in the form of the crystalline salt.

The concentration of hydrochloric acid may be from about 0.05 to about 1.9 normal. It has been found that the reaction rate increases rapidly as the concentration of hydrochloric acid is increased. The chlorine dioxide efficiency increases with increasing hydrochloric acid concentration, demonstrating a marked change in efficiency in the acid normality range of about 0.2 to about 1.3 normal, after which the chlorine dioxide efficiency begins to increase. At an acid normality of about 1.9 normal hydrochloric acid, the chlorine dioxide efficiency of the reaction is such that, for commercial applications, higher acid ranges with further decreased chlorine dioxide efficiencies may be regarded as unacceptable. Thus, the preferred acid range is between about 0.2 to about 1.3 normal and most preferred range is about 0.3 to about 1.0 normal hydrochloric acid, at any given chlorate and chloride concentration.

One very remarkably advantage residing in the use of hydrochloric acid as opposed to sulfuric acid as the strong acid in the chlorine dioxide generating process of the instant invention resides in the fact that there appears to be no intermediate salt formation such as there is in the formation of sodium bisulfate. Heretofore, chlorine dioxide generating processes utilizing sulfuric acid as the strong acid have demonstrated marked reduction in their reaction rate after the initial start-up period. This reduced rate of reaction was also observed after a shut down period, when starting again with the aged generator solution (the generator solution which has been employed in the production of chlorine dioxide for a period of approximately 24 hours). The reduced rate in the production of chlorine dioxide in processes employing sulfuric acid to maintain the reaction solution acidity may be attributed to the formation of sodium bisulfate which is the reaction rate controlling step in the overall conversion of sodium chlorate and sulfuric acid to chlorine dioxide, chlorine and neutral sodium sulfate ($Na_2SO_4$). When employing hydrochloric acid as the strong acid, there is no intermediate salt formation which can inhibit the overall reaction rate. Hence, a very rapid reaction ensures when the reaction is begun and continues throughout the run whether there has been an intermediate shut-down period or not.

The reaction rate of sodium chlorate conversion to chlorine dioxide is markedly higher when employing hydrochloric acid than it is with sulfuric acid and sodium chloride. Both the reaction rate and chlorine dioxide efficiency are improved in the presence of the catalysts described herein over the corresponding non-catalyzed low-acid hydrochloric acid reaction.

As the reaction producing the chlorine dioxide occurs within the generator, crystals of sodium chloride in amounts and presence dependent generally upon the acid concentration used, are crystallized out and settle to the bottom of the generator from whence they are withdrawn in the form of a slurry.

Generally, past techniques for processing the withdrawn slurry have involved processes such as contrifugal separation, filtration and other standard separation techniques. Mother liquors and water, which where employed in such separatory procedures, may or may not be returned to the generator.

However, such crystal slurry treatment processes have not been totally satisfactory in the single vessel process due to maintainance problems, the requirements for additional steam sources to operate the filter and more importantly, filtration does not return, at substantially high efficiency to the reactor, chlorate and chloride values present in the withdrawn crystal slurry.

It is an object of the present invention to provide an improved process for the treatment of the crystal slurry produced in singel vessel chlorine dioxide production, efficiently separate the crystalline constituents therefrom and to recover substantially all of the chlorate, chloride and acid values for return to the generator for further reaction.

In accordance with the present invention, single vessel process slurry is introduced into the top of a separatory column, water, at a temperature from about ambient to about boiling and preferably at a temperature of from about 20 to about 70° C, is added continuously via an inlet located near the bottom of the separatory column in contercurrent flow to the downward flow of the slurry, with the crystals contained in the downward flowing slurry continuously washed by the water, and the crystals removed as aqueous slurry via an outlet located near the bottom of the separatory column.

By the present process, the efficiency of the chlorine dioxide generating system is increased, essentially all of the chloride, chlorate values and acid values being returned in a continuous washing to the generator and less energy is required in operating the system.

The size of the separatory column may be on the order of 6-24 inches in diameter and 10-15 feet or longer, dependent primarily on the size of the generator employed.

The rates of flow of slurry and water are adjusted so as to provide a maximum washing efficiency without substantially increasing the steam requirements for the vacuum evaporation in the generator, generally about 0.2 to about 4 pounds of water per each pound of sodium chloride produced continuing into the generator and the remaining water sufficient to continuously remove the sodium chloride as a flowable slurry from the separatory column. The slurry of crystalline sodium chloride may be removed and utilized for the manufacture of sodium chlorate.

Though the process of the present invention is particularly suitable to a single vessel chlorine dioxide generating process it is not limited to such and may be readily adapted to a chlorine dioxide generating system wherein the spent generator slurry is crystallized in a separate vessel by providing transport of the recovered chlorate, chloride and acid values to the generator.

Figure 2:
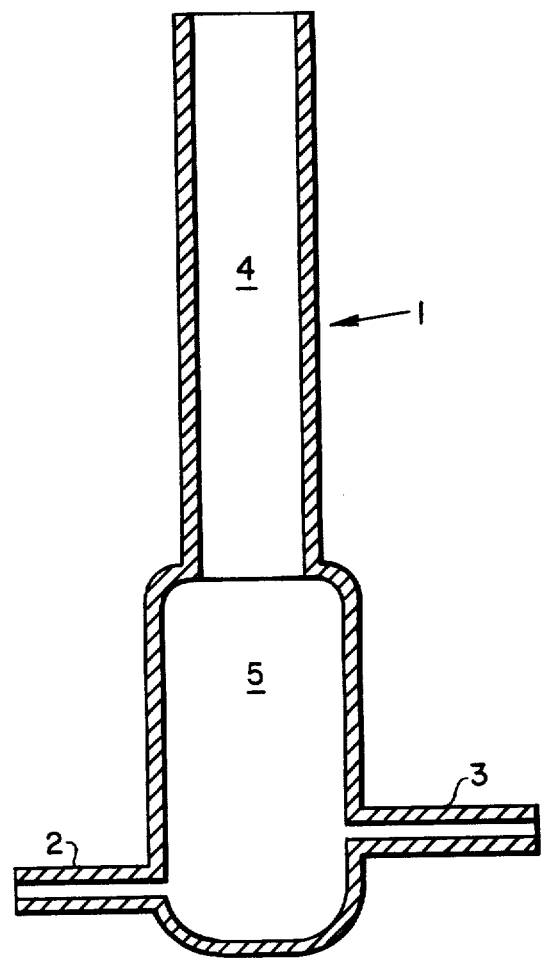

FIGS. 1 and 2 are illustrative of the separatory columns which are advantageously employed in the process of the present invention. FIGS. 1 and 2 are schematic vertical elevations.

FIG. 1 is illustrative of a separatory column which is advantageously employed in the process of the present invention. The apparatus is a separatory column or tower 1 made of any suitable construction materials, such as for example, titanium, plastics, ceramics, or the like. The column is preferably, although not necessarily, substantially cylindrical having an inlet means 2 at the upper portion thereof for the introduction of crystal slurry from the single vessel reactor (not shown). The lower portion of the column is provided with a water inlet 3 and a washed crystal takeoff means 4. Column 1 is divided into multiple treatment zones 6, 8, 10, etc. by plates incorporating at least one and preferably multiple downwardly tapering funnel shaped configurations 7 having openings 9 at the apex for discharging crystal slurry downward into turbulent washing zones 6, 8, 10 etc. the flow of crystal-containing slurry directed downwardly from plate to plate, and succeeding turbulent washing zones.

Each plate is provided with multiple aperatures 11 located at or near the junction of the uppermost portion of the funnel-shaped configuration and the plate. As the crystal containing slurry moves downward onto the plate and through the opening 9, the upcoming flow of water is diverted in part through openings 11, setting up a circulatory flow around and in the funnel shaped configuration, creating turbulence in the zones immediately below the openings 9, continuously freeing the chloride crystals from chlorate, and acid values and continuously permitting the downward passage of sodium chloride for removal via outlet 4. Control of the downward flow of the crystals and the extent of the turbulence is conveniently effected by adjusting the relative sizes of the openings 9 and 11.

Zone 12 of the apparatus is a relatively non-turbulent zone wherein the crystals settle by gravity and are not carried by rising liquid to the zone above.

The column may be located immediately below the generator in which instance the crystal slurry moves by gravity flow from the generator (not shown) into the column via inlet 2. Chlorate, chloride and acid values are continuously retured directly to the generator in that portion of the wash water directed by upward flow into the generator. In those instances where space and other factors dictate the placement of the column at a site adjacent to or remote from the generator, the crystal slurry is pumped by suitable pumping means (not shown) to the column via inlet 2.

The total number of plates situated in the column may be varied, depending generally upon the size of the generator, amounts of crystal slurry to be handled in a given time period, space considerations. Generally, in operations where standard generators are used with a capacity of about 6000 gallons, columns of about 10-15 feet in length, 2-3 feet in diameter having 8-12 plates situated approximately one foot apart are suitable.

In those instances where space and other factors dictate the placement of the separatory column at a site adjacent the single vessel generator, crystal-containing slurry removed from the bottom of the generator is pumped by suitable pumping means (not shown) to the top of the separatory column and the wash water containing chlorate, chloride and acid values returned from zone 10 of the separatory column to the generator via suitable outlet and conveying means (not shown).

FIG. 2 represents another separatory column useful in the process of the present invention. The separatory column, as with the separatory column of FIG. 1, may be situated adjacent to or immediately below the single vessel generator. In those instances where the separatory column is located immediately below the single vessel generator, crystal slurry is continuously moved from the bottom of the generator (not shown) to the top of the column 1 at zone 4. Wash water is continuously admitted to the column via 2 and flows upwardly through the column, continuously washing the down flowing crystals, and continuously returing the chlorate, chloride and acid values removed therefrom to the generator from the top of the column. The washed crystals move downward into a crystal collection zone 5 from whence they are removed viz outlet 3. Outlet 3, shown as located at a point on the column 1 above the water inlet 2, may be varied in position near the bottom of the column.

As with the column in FIG. 1, this separatory column can also be situated adjacent the single vessel reactor, in which instance pumping means are provided to continuously feed the crystal slurry from the generator to the separatory column, and the water containing the removed chlorate, chloride and acid values continuously removed from the top of the column and returned continuously to the generator via suitable pumping and inlet means.

Utilizing the process of the present invention, it was found that the amount of chlorate, and acid values remaining in the recovered chloride were approximately 0.2 to about 0.25 that remaining in the chloride when attempting standard separatory techniques with filters.

I claim:

1. In a process for continuously generating a mixture containing chlorine dioxide, chlorine and an alkali metal salt wherein
   a. an alkali metal chlorate and hydrochloric acid are continuously reacted in proportion to generate chlorine dioxide and chlorine;
   b. the temperature is maintained from about 50 to about 100° C;
   c. The acidity of the reaction solution is maintained within the range of about 0.05 to about 2.5 normal;
   d. chlorine dioxide and chlorine produced by said reaction is withdrawn from the reactor;
   e. water is removed and alkali metal salt of said hydrochloric acid is crystallized in the form of an aqueous slurry containing minor amounts of chlorate, and acid values;

The improvement which comprises:
continuously passing the slurry containing alkali metal salt crystals into the top of a separatory column, in a downward flow;
countercurrently passing a stream of water continuously upwardly through said column at a rate sufficient to effect washing of the downwardly flowing crystals whereby chlorate, chloride and acid values recovered therefrom are continuously and substantially completely returned to the reaction of (a) aforesaid; and continuously removing an aqueous slurry of substantially pure alkali metal chloride salt crystals from the bottom of said separatory column.

2. The process as defined by claim 1 wherein the alkali-metal chlorate is sodium chlorate and the alkali-metal chloride is sodium chloride.

3. The process as defined in claim 1 wherein the acidity of the reaction solution is maintained within the range of about 0.05 to about 1.9 normal.

4. The process of claim 1 wherein the acidity of the reaction solution is maintained within the range of about 0.2 to about 1.3 normal.

5. The process of claim 1 wherein the molarity of alkali metal chlorate is preferably maintained in the range of about 0.2 to about 5 molar.

6. The process as defined by claim 1 wherein the temperature of the wash water is maintained at from about 20 to about 70° C.

7. The process as defined by claim 1 wherein the wash water is continuously fed into the separatory column at a rate sufficient to provide from about 0.2 to about 4 pounds of water per each pound of alkali metal salt crystals produced in said generator-evaporator-crystallizer.

8. In a process for continuously generating a mixture containing chlorine dioxide, chlorine and an alkali metal salt wherein
   a. an alkali metal chlorate and hydrochloric acid are continuously reacted in a single vessel generator-evaporator-crystallizer in proportions to generate chlorine dioxide and chlorine;
   b. the temperature is maintained at between about 50 to about 100° C;
   c. The acidity of the reaction solution is maintained within the range of from about 0.05 to about 2.5 normal;
   d. the reaction solution is subjected to a vacuum of from about 100 at about 400 millimeters of mercury absolute to effect evaporation of water vapor;
   e. chlorine dioxide and chlorine produced by said reaction solution is withdrawn in admixture with said water vapor, and the reaction is conducted in the presence of at least one catalyst selected from the group consisting of vanadium pentoxide, silver ions, manganese ions, dichromate ions and arsenic ions; and
   f. alkali metal salt of said mineral acid is crystallized within said generator-evaporator-crystallizer and withdrawn therefrom in the form of an aqueous slurry containing minor amounts of chlorate, and acid values;

the improvement which comprises:
continuously passing the slurry containing alkali metal salt crystals produced in said generator-evaporator-crystallizer into the top of a separatory column, in a downward flow;
countercurrently passing a stream of water continuously upwardly through said column at a rate sufficient to effect washing of the downwardly flowing crystals whereby chlorate, chloride and acid values recovered therefrom are continuously and substantially completely returned to said generator-evaporator-crystallizer; and
continuously removing an aqueous slurry of substantially pure alkali metal chloride salt crystals from the bottom of said separatory column.

9. The process as defined by claim 8 wherein the alkali-metal chlorate is sodium chlorate and the alkali metal chloride is sodium chloride.

10. The process as defined in claim 8 wherein the acidity of the reaction solution is maintained within the range of about 0.05 to about 1.9 normal.

11. The process of claim 8 wherein acidity of the reaction solution is maintained within the range of about 0.2 to about 1.3 normal.

12. The process of claim 8 wherein the molarity of alkali metal chlorate is preferably maintained in the range of about 0.2 to about 5 molar.

13. The process as defined by claim 8 wherein the temperatures of the wash water is maintained at from about 20° to about 70° C.

14. The process of defined by claim 8 wherein the wash water is continuously fed into the separatory column at a rate sufficient to provide from about 0.2 to about 4 pounds of water per each pound of alkali metal salt crystals produced in said generator-evaporator-crystallizer.

* * * * *